United States Patent [19]

Kurata et al.

[11] 4,351,421
[45] Sep. 28, 1982

[54] DISC BRAKE

[75] Inventors: Masayuki Kurata, Kazo; Yushiyo Watanabe, Kuki, both of Japan

[73] Assignee: Akebono Brake Industry Co., Ltd., Tokyo, Japan

[21] Appl. No.: 170,984

[22] Filed: Jul. 18, 1980

[30] Foreign Application Priority Data

Aug. 10, 1979 [JP] Japan .................................. 54-102020

[51] Int. Cl.³ .......................................... F16D 55/224
[52] U.S. Cl. .................................................. 188/73.45
[58] Field of Search ................. 188/72.4, 73.31, 73.43, 188/73.44, 73.45

[56] References Cited

U.S. PATENT DOCUMENTS

| 4,019,610 | 4/1977 | Hirai | 188/73.45 |
| 4,034,857 | 7/1977 | Kondo et al. | 188/73.45 X |
| 4,061,209 | 12/1977 | Gee et al. | 188/73.45 X |

Primary Examiner—Duane A. Reger
Attorney, Agent, or Firm—Toren, McGeady & Stanger

[57] ABSTRACT

Reduction in weight and simplification of structure of a pin type disc brake for a vehicle are attained by using left and right guide pins. In the past such pins been used to carrying a caliper and permit movement thereof in the axial direction of a disc to push a pair of inner and outer friction pads against both sides of the disc. In this brake disc the pins are arranged to carry the inner and outer friction pads in addition to the caliper.

7 Claims, 4 Drawing Figures

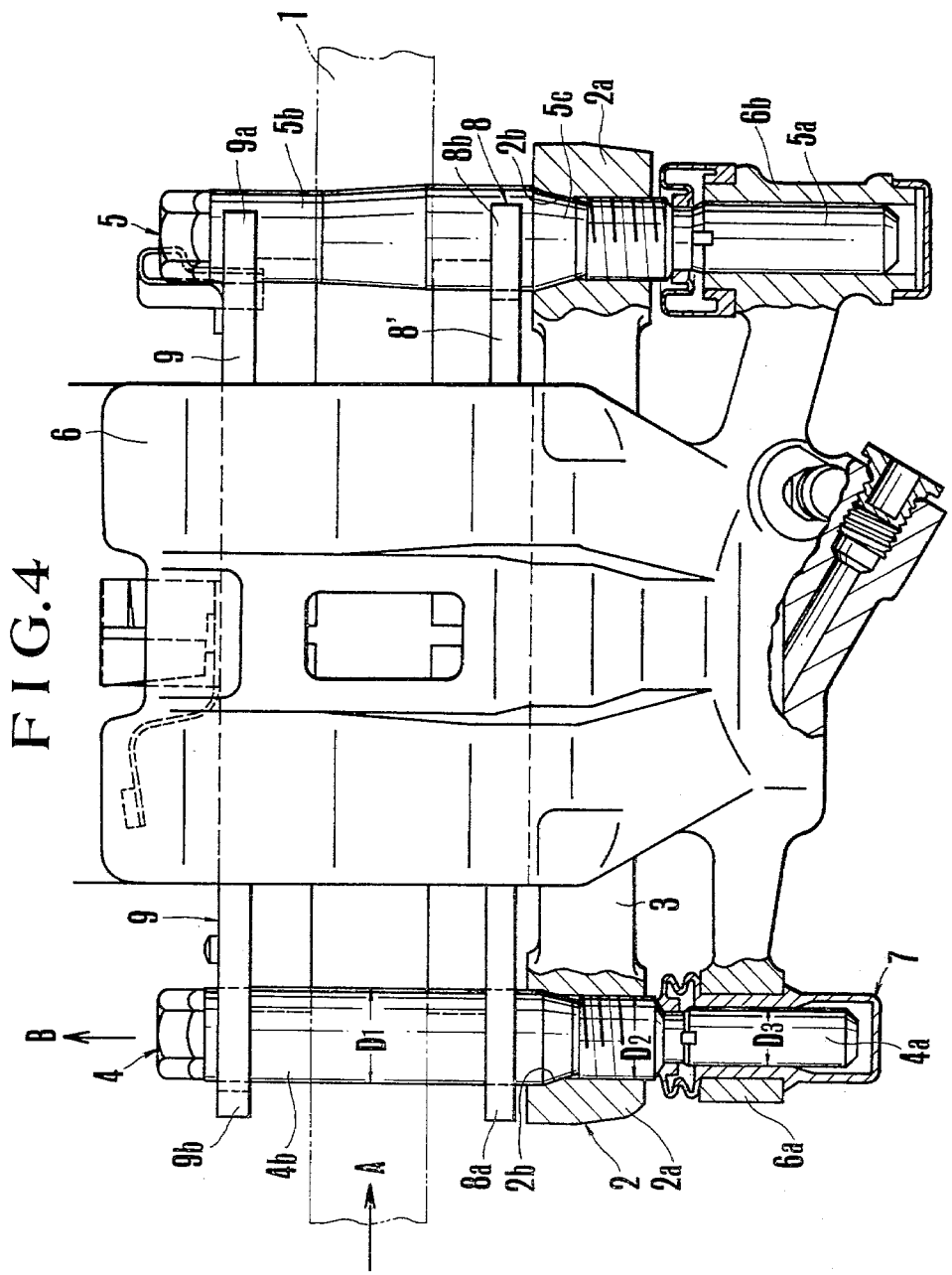

DISC BRAKE

BACKGROUND OF THE INVENTION

This invention relates to an improvement on a pin type disc brake.

Reduction in weight and simplification of structure of machines in general have continuously been sought after. Particularly, in the case of brake devices to be mounted on vehicles, simplification of structural arrangement to facilitate maintenance and check-up work and reduction in weight for improvement in energy efficiency are considered very important. However, these requirements have not sufficiently been met by the conventional brake devices.

SUMMARY OF THE INVENTION

It is therefore a general object of this invention to provide a pin type disc brake which meets the above stated requirements. To attain this object, a pair of left and right guide pins are used which in the past has been used for carrying a caliper to permit its movement in the axial direction of a disc to push a pair of inner and outer friction pads against both sides of the disc in the conventional brake of this type. In this brake disc the pins are arranged to carry the above stated pair of friction pads and, in addition, have the function of carrying the caliper.

In accordance with the invention, a pair of right and left guide pins which have the ends thereof arranged to extend from both sides of a disc are secured to a support (or a knuckle) which extends from a rigid structural part of a vehicle toward the edge portion of the disc. The parts of these guide pins extending from one side of the disc are arranged to carry a caliper in such a way as to permit the caliper to move in the axial direction of the disc while the parts of them extending toward the other side of the disc are arranged to carry inner and outer friction pads to permit the movement of these friction pads in the axial direction of the disc. Further, the brake torques produced at the two friction pads are arranged to be borne by different guide pins respectively.

The above and further objects, features and advantages of the invention will become apparent from the following detailed description of embodiment thereof taken in connection with the accompanying drawings.

BRIEF DESCRIPTION OF THE DRAWINGS

FIG. 4 is a plan view showing a disc brake as another embodiment of the invention.

DETAILED DESCRIPTION OF PREFERRED EMBODIMENTS

Figure 1:
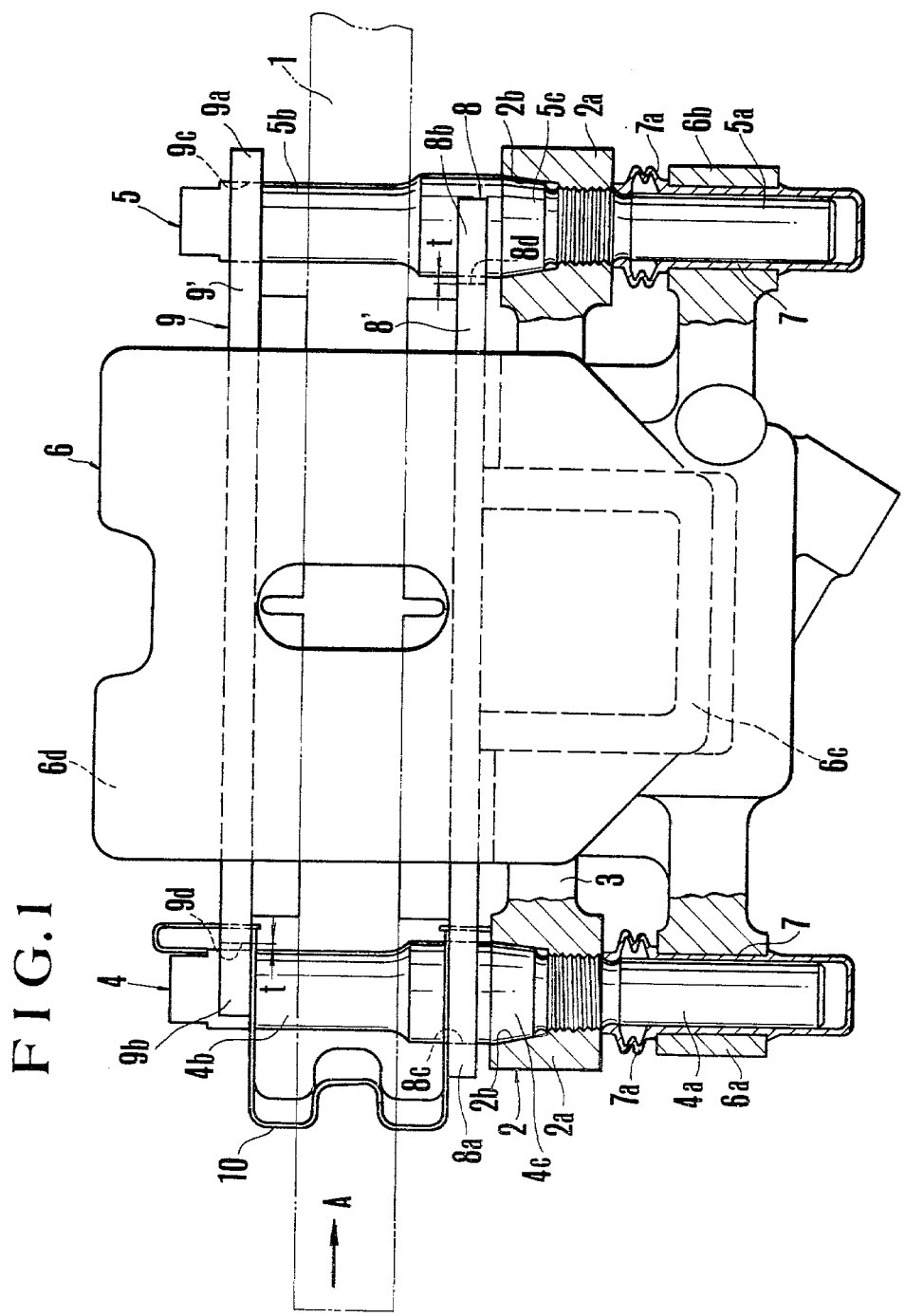
FIG. 1 is a plan view showing a disc brake as embodiment of the present invention.
Figure 2:
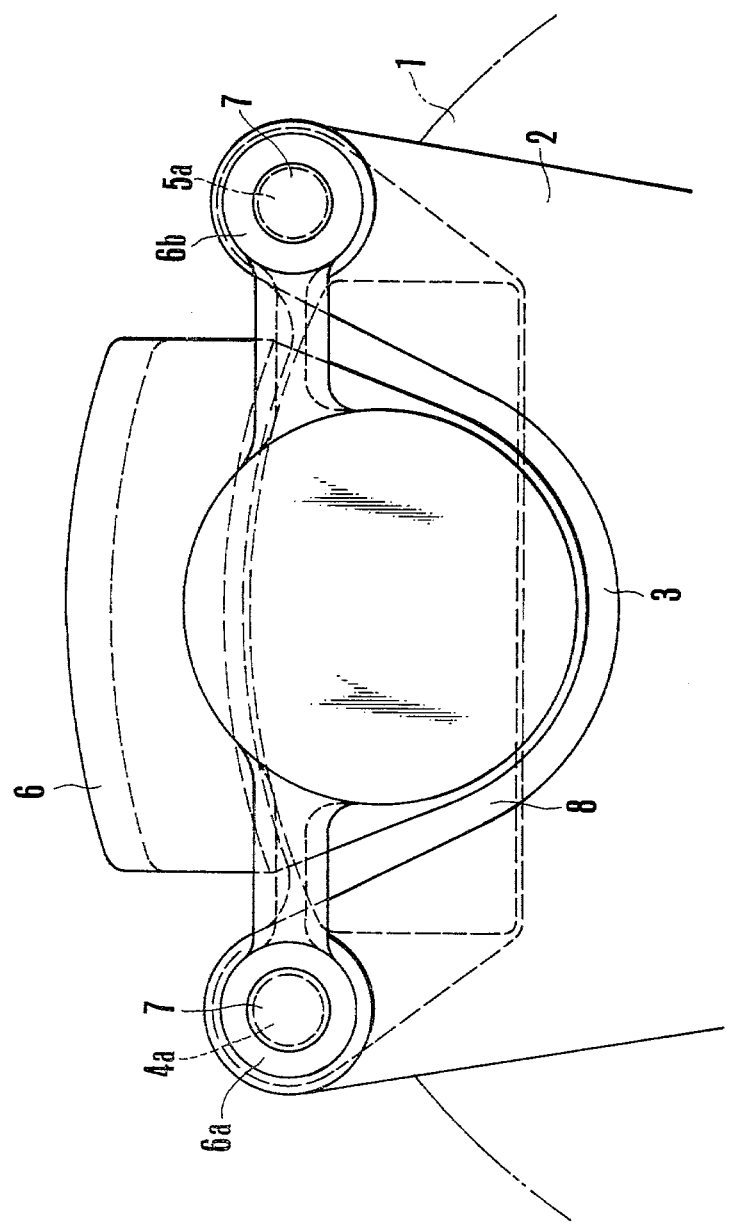
FIG. 2 is a front view of the embodiment shown in FIG. 1.

In FIGS. 1 and 2 which show an embodiment of the invention, there are provided a disc 1; a support 2 which extends from a rigid structural part of a vehicle and has a recessed part 3 opening to the outside of the disc in such a way as to embrace a caliper 6 with a pair of arm parts 2a provided there; and a pair of left and right guide pins 4 and 5 each of which is fixedly screwed to the tip of the arm part 2a with a screw part provided in the middle part thereof for securing it to the arm part 2a of the support. The guide pins are provided with caliper guiding parts 4a and 5a in their end portions extending in the direction away from the disc 1 while, in their end portions extending to the other side of the disc, the guide pins are provided with friction pad guiding parts 4b and 5b. The guide pins 4 and 5 are secured to the support 2 with tapered parts 4c and 5c formed in the middle parts of them engaged with the tapered hole parts 2b formed in the support 2.

A caliper 6 is provided with boss parts 6a and 6b which protrude to the left and right to be slidably connected to the caliper guiding parts 4a and 5a of the above stated guide pins 4 and 5 through elastic bushes 7. The caliper 6 is thus carried by the caliper guiding parts to be movable in the axial direction of the disc 1. Each of the elastic bushes 7 is formed into one unified body with a sliding part covering boot. The caliper 6 is provided with a piston 6c which is disposed on the inner side thereof and is arranged to push an inner friction pad 8 against the disc 1 and a caliper reaction part having a claw part 6d which is arranged to slide in the axial direction of the disc 1 to push an outer friction pad 9 against the disc 1 by a reaction to the pushing action of the piston 6c. With the friction pads thus pushed against the disc 1 on both sides thereof, there is produced a braking force.

The above stated inner and outer friction pads 8 and 9 have the end parts 8a, 8b, 9a and 9b of their backing plates attached to the above stated pair of guide pins 4 and 5 and are thus carried by the pair of guide pins 4 and 5 to be movable in the axial direction of the disc. In addition to that, the engaging relation of these end parts of the inner and outer friction pads to the guide pins 4 and 5 is arranged such that, the torques which are produced at the inner and outer friction pads 8 and 9 are borne respectively by different guide pins 4 and 5. In other words, in this particular embodiment, a hole 8c which is provided in one of the end parts 8a of the backing plate 8' of the inner pad 8 is arranged to engage with one of the guide pins 4 while a U-groove 8d provided in the other end part 8b of the backing plate 8' is arranged to engage with the other guide pin 5. Further, between the U-groove 8d and the guide pin 5, there is provided a clearance t in the circumferential direction of the disc 1. A hole 9c which is provided in one of the end parts 9a of the backing plate 9' of the outer friction pad 9 is arranged to engage the guide pin 5 while a U-groove 9d which is provided in the other end part 9a of the backing plate 9' is arranged to engage with the guide pin 4. Between the U-groove 9d and the guide pin 4, there is also provided a clearance t in the same manner as in the case of the inner friction pad 8. A reference numeral 10 indicates a pad retaining spring and an arrow A indicates the direction in which the disc rotates when the vehicle is running forward.

With the embodiment arranged in this manner, during brake application, the brake torques produced at the inner and outer friction pads 8 and 9 are received respectively by the guide pins which engage the holes 8c and 9c of the backing plates 8' and 9'. To be more specific, it is only the guide pin 4 that serves as torque receiving pin for the inner pad 9 while it is only the other guide pin 5 that serves as torque receiving pin for the outer pad 8. The arrangement being such, the brake torque of the whole disc brake is received by dispersing and distributing it to the left and right guide pins, that is, by the two arm parts 2a, so that concentration of torque receiving pressure on one part of the support 2 can be effectively avoided. This torque dispersing arrangement has an advantage over the conventional torque concentrating arrangement in terms of requirement for the strength of the arm parts 2a. Further, the arrangement to have the caliper 6 and the inner and outer friction pads 8 and 9 carried and slidably guided by the same pair of guide pins 4 and 5 permits simplification of structure and reduction in the number of parts required to a great extent.

The present invention is not limited to the above stated structural arrangement of the embodiment. For example, one of or both of the guide pins may be arranged to carry the caliper without having the elastic bush interposed in between the sliding contact faces of the guide pin and the boss of the caliper; or the illustrated arrangement to prevent the guide pins from tilting by fitting the guide pins into the tapered parts 2b formed in the support 2 may be replaced with another arrangement to effect fitting engagement by means of hexagonal holes and hexagon nuts.

Figure 3:
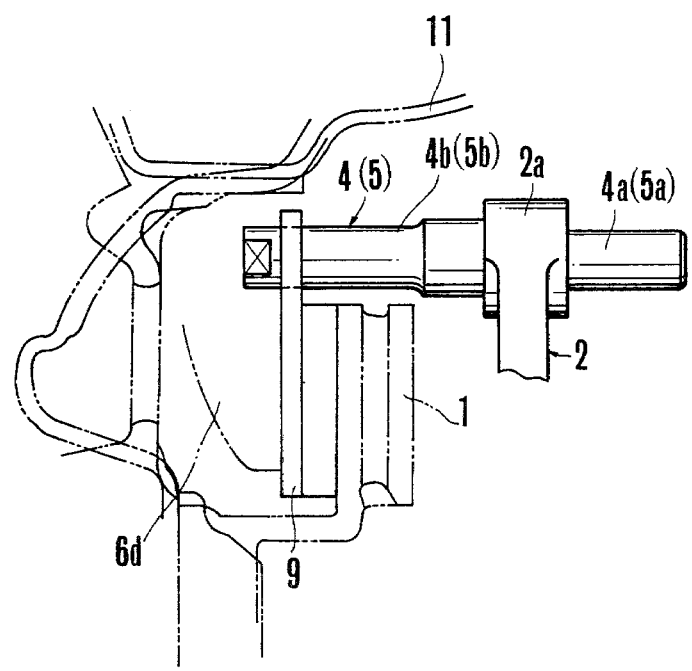
FIG. 3 is a side view showing the left-hand side of the embodiment shown in FIG. 1 as in a state of having the caliper removed therefrom.

Further, in the structural arrangement described in the foregoing, the guide parts 4b and 5b of the guide pins 4 and 5 which carry the inner and outer friction pads 8 and 9 are disposed across the outside of the periphery of the disc within a space which is relatively narrow because of the presence of a wheel 11 as shown in FIG. 3. In view of this, in accordance with the invention, each of the guide pins 4 and 5 is arranged to have a larger diameter within the larger space which is available between the support 2 of the guide pin 5 and the braking face of the disc 1 for the inner pad 8. Meanwhile, each of the guide pins 4 and 5 is arranged to have a smaller diameter within the volumetrically limited space available for supporting the outer pad 9 at a part straddling the disc.

Compared with the conventional arrangement of using guide pins of unvaried diameter, the above stated arrangement of the invention gives an increased rigidity to the guide pins 4 and 5 as much as the part thereof located within the volumetrically ample space to minimize the degree of deflection of the guide pin. Therefore, in accordance with invention, an adverse effect resulting from the deflection of the guide pins (such as uneven wear of the friction pads) can be held to a minimal degree. This is an advantage of the invention for practical application thereof.

FIG. 4 shows another embodiment of the invention with the like parts indicated by the same reference numerals as in the preceding embodiment. In this embodiment, when the disc 1 is rotating in the direction of the arrow A while the vehicle is running forward, the brake torque of the inner friction pad 8 is received by the guide pin 4 and that of the outer friction pad by the guide pin 5 in the same manner as in the preceding embodiment.

When the vehicle is running backward, the brake torques of both friction pads are received by the guide pin 4. In this particular embodiment, the elastic bush 7 is provided only between the boss part 6a and the caliper guiding part 4a of the guide pin 4 located on the rotation leading side of the disc with the vehicle running forward. Meanwhile, the caliper 6 is arranged to be reliably guided in the axial direction of the disc by the guide pin 5. The edge part 9a of the backing plate 9' is formed into a U-groove.

The outer diameter D1 of the part of the pad guiding part 4b of the guide pin 4 which extends from the support 2 across the disc to carry the outer pad 9 is unvarying. Assuming that the outer diameter of the screw part of the guide pin 4 is D2 and that the outer diameter of the caliper guiding part 4b thereof is D3, there obtains a relation of $D1 > D2 > D3$. Therefore, this arrangement permits the guide pin 4 to be pulled out toward the outside of the vehicle in the axial direction of the disc (in the direction of B as shown in FIG. 4). Old friction pads can be readily replaced with new ones by removing the guide pin 4; turning the caliper 6 on the guide pin 5; and then by pulling the outer pad 9 in the axial direction of the disc and the inner pad 8 in the circumferential direction of the disc.

What is claimed is:

1. A disc brake comprising:
a disc which is arranged to have the brake applied thereto;
inner and outer friction pads;
a caliper provided with a thrusting mechanism which is arranged to cause said inner friction pad to engage with one side of said disc, said caliper being arranged to move to cause said outer friction pad to engage with the other side of the disc by a reaction to a thrusting action of said thrusting mechanism;
a support member; and
first and second guide pins secured to said support member, said first and second guide pins being arranged to guide said two friction pads and said caliper, said guide pins extending from one side of said disc to the other side thereof,
a brake torque produced at said inner pad being arranged to be received solely by said first guide pin and a brake torque produced at said outer friction pad solely by said second guide pin, each of said guide pins is provided with a caliper guiding part which engages with a boss part of said caliper; and a pad guiding part which is arranged to carry said friction pads, said caliper guiding part and said pad guiding part being formed into one unified body, each of said guide pins being fixedly screwed to said support at a point between said two guiding parts.

2. A disc brake according to claim 1 wherein each of said guide pins is rigidly secured to said support member with a tapered part formed in the middle part of said guide pin and arranged to engage with a tapered hole part provided in said support member.

3. A disc brake according to claim 1 wherein at least one of said guide pins is arranged to have a larger outer diameter in a portion thereof extending from said support member to said one side of said disc than an outer diameter of another portion thereof extending from the part straddling said disc to a part thereof carrying said outer friction pad.

4. A disc brake according to claim 1 wherein there is provided an elastic bush only between the caliper guiding part of said first guide pin and a boss part of said caliper; and said caliper is arranged to be guided in the axial direction of the disc by the caliper guiding part of said second guide pin.

5. A disc brake according to claim 4 wherein the pad guiding part of said first guide pin has unvaried outer diameter in the portion thereof extending across said disc from said support member to a part thereof carrying said outer friction pad.

6. A disc brake according to claim 5 wherein said first guide pin is cylindrically shaped and has axially extending sections each with a different diameter extending between the first end and second end of said first guide pin, said first guide pin comprises a pad guiding section extending from said first end thereof, a caliper guiding section extending from the second end thereof and a screw section provided for screwed engagement with said support member extending between said pad guiding section and said caliper guiding section, and the diameter of said pad guiding section being greater than the diameter of said screw section and said caliper guiding section and the diameter of said screw section being larger than the diameter of said caliper guiding section so that the replacement of said two friction pads can be effected by pulling said first guide pin at the first end thereof toward the outside of the vehicle in the axial direction of the disc and by turning said caliper on said second guide pin.

7. A guide disc, according to claim 6, wherein said guide pin is located on the rotation leading side of said disc when the vehicle runs forwardly, and said second guide pin is located on the trailing side thereof.

* * * * *